United States Patent Office 3,244,668
Patented Apr. 5, 1966

3,244,668
STABILIZED PLASTIC
Gordon G. Knapp, Royal Oak, and Calvin J. Worrel, Detroit, Mich., assignors to Ethyl Corporation, New York, N.Y., a corporation of Virginia
No Drawing. Filed Jan. 23, 1961, Ser. No. 83,896
5 Claims. (Cl. 260—45.85)

This invention relates to the stabilization of plastic against the oxidative and deteriorative effects of ultraviolet light.

The deterioration of plastics on light exposure is caused by radiation between 300 to 400 millimicrons wavelength. The lower the wavelength of the incident light, the higher the energy content per photon, and the more damaging its effect potentially. To produce chemical change in a material, this energy must first be absorbed. Plastics differ appreciably in their ultraviolet absorbing properties, but none are completely transparent in the 300 to 400 millimicron range. All absorb significantly at 300 millimicrons. Once radiant energy is absorbed, the likelihood of chemical change will depend on the stability of chemical bondings and the polymer. The deteriorative effect of light is usually enhanced by the presence of oxygen, moisture, and heat. In many cases, the deterioration is properly photo-oxidation. Color changes are frequently associated not only with the polymer, but with impurities such as residual styrene monomer in polystyrene or traces of iron in polyesters or with sensitive additives such as plasticizers or dyestuffs. It is significant that this type of oxidation cannot be mitigated to any appreciable extent with conventional antioxidants. Indeed, it is often found that antioxidants which are excellent stabilizers in other media afford no relief whatsoever from this type of oxidation.

Thus, it is an object of this invention to provide a superior stabilizing material which inhibits the oxidative and deteriorative effects of ultraviolet light. A further object is to provide improved plastic containing such stabilizing material.

The above and other objects are accomplished by providing a plastic containing a small stabilizing quantity, up to about 5 percent, and preferably from 0.001 to about 3 percent, of a compound represented by the formula (I)

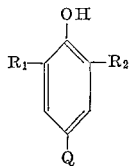

wherein $R_1$ is an alkyl group having from 1-12 carbon atoms, $R_2$ is an alpha-branched alkyl group having from 3-12 carbon atoms, and Q is selected from the group consisting of HC=O and $NO_2$; and a small stabilizing quantity, up to about 5 percent, and preferably from 0.001 to about 3 percent, of a compound represented by the formula (II)

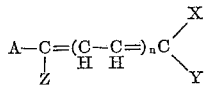

wherein A is an aromatic group having an isolated benzene nucleus, said benzene nucleus being directly attached to the carbon directly linked to the group designated by Z, Z is selected from the group consisting of hydrogen, alkyl radicals containing from 1-12 carbon atoms, aryl radicals containing from 6-12 carbon atoms and aralkyl radicals containing from 7-12 carbon atoms; Y is selected from the group consisting of hydrogen, a cyano radical, a nitro radical, a difluoromethyl radical, a trifluoromethyl radical and a group having the formula

wherein R is selected from the group consisting of hydrogen, alkyl radicals containing from 1-12 carbon atoms and aralkyl radicals containing from 7-12 carbon atoms; X is selected from the group consisting of a cyano radical, a nitro radical, a difluoromethyl radical, a trifluoromethyl radical, and a group having the formula

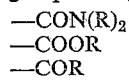

and $n$ is an integer from 0-4 inclusive.

The compounds described above, when used according to this invention, impart to plastic material outstanding stability toward the oxidative and deteriorative effects of ultraviolet light. The compounds are relatively inexpensive, readily prepared and compatible with most organic media. Many of the compounds also have the added advantage of possessing antioxidant properties aside from the ability to absorb ultraviolet light. The additive combinations of this invention absorb ultraviolet light over a relatively large band of the spectrum. Thus, for example, a mixture of equal parts of 3,5-di-tert-butyl-4-hydroxybenzaldehyde and ethyl-3,5-di-tert-butyl-α-cyano-4-hydroxycinnamate effectively absorbs ultraviolet light from 2600 to 3900 A. This absorption encompasses that part of the spectrum which is most responsible for the light-catalyzed degradation of plastic.

The aromatic groups which are represented by A in Formula II are groups containing an isolated benzene nucleus. That is, they are aromatic groups which are free of aliphatic unsaturation. The applicable aromatic groups have no aliphatic double bond in conjugated relationship to the ring. Thus, aralkyl and alkyl substituted aromatic groups are applicable to this invention. Likewise, hydroxy, polyhydroxy, alkoxy and aralkoxy substituted aromatic groups are applicable to this invention. Groups containing a combination of alkyl, hydroxy, alkoxy, or aralkoxy substituents, are also applicable to this invention. Aromatic groups having from 6-30 carbon atoms are generally preferred in this invention. Examples of applicable groups include benzene itself; alkyl substituted benzenes such as the xylenes, mesitylene, hemimellitene, pseudocumene, cumene, isocumene, prehnitene, isodurene, durene, the cymenes, 4-methyl-3-tert-butylbenzene, 4-methyl-2-tert-butylbenzene, 4-methyl-2,6-di-tert-butylbenzene, 2,4-diisopropylbenzene, 4-methyl-2-isopropylbenzene, 4-methyl-3-n-dodecylbenzene and 2,4-di-n-dodecylbenzene; aralkyl substituted benzenes such as the styrenated benzenes, 4-p-ethylbenzyl-2,5-di-p-n-hexylbenzylbenzene, 2,3,4-tri-o-ethylbenzylbenzene and 4,6-dibenzylbenzene; hydroxy substituted benzenes such as phenol, catechol, resorcinol, hydroquinone, hydroxy-hydroquinone, phloroglucinol, the tetrahydroxybenzenes and the pentahydroxybenzenes; the alkoxy benzenes such as methoxy benzene, n-dodecoxy benzene, n-pentoxy benzene, 2,4-ethoxy-5-isopropoxy benzene; the aralkoxy benzenes such as p-hexylbenzoylbenzene, and 4-o-ethylbenzoyl-2-p-n-pentylbenzoylbenzene; combinations of alkyl, aralkyl, hydroxy, alkoxy, and aralkoxy benzenes such as thymol, carvacrol, chavicol, the cresols, estragole, anethol, veratrole, quaiacol, orcinol, 2-tert-butyl-n-cresol, 2-methyl-6-tert-butylphenol, 2,6-di-tert-butylphenol, 2,6-diisopropylphenol, 2-methyl-6-isopropylphenol, 2-methyl-6-n-dodecylphenol, 2,6-di-(3'-dodecyl)phenol, 2,5-diisoamylphenol, 3,5-di-tert-butylphenol, 3,5-di-tert-butyl-4-methoxybenzene, 3,6-di(2'-heptyl)-4-n-decoxybenzene, 2- methyl-6-n-dodecyl-5-ethoxy-3-benzoylphenol, 2-methyl-4-tert-butyl-catechol, 2-n-dodecyl - 3 - methyl-6-ethylresorcinol, 3-n-butoxy-5-p-n-hexylbenzyl-6-n-propylhydroquinone and 2,3,5-tri-ethylphloroglucinol.

Although the benzene-containing groups described above are named as entire compounds, they all have, actually, an open position on the benzene ring whereby they are attached directly to the carbon directly linked to the group designated by Z in Formula II.

Examples of the compounds of Formula I include:
2-tert-butyl-6-methyl-4-nitrophenol,
3,5-di-tert-butyl-4-hydroxybenzaldehyde,
2,6-di-(3′-dodecyl)-4-nitrophenol,
3-(3′-dodecyl)-4-hydroxy-5-methylbenzaldehyde,
2-sec-butyl-4-nitro-6-n-octylphenol,
4-hydroxy-3,5-diisopropylbenzaldehyde,
2-isopropyl-6-methyl-4-nitrophenol,
3-n-amyl-5-(2′-hexyl)-4-hydroxybenzaldehyde,
3-tert-butyl-4-hydroxy-5-methylbenzaldehyde,
2,6-di-tert-butyl-4-nitrophenol,
3,5-di-(2′-decyl)-4-hydroxybenzaldehyde,
2-ethyl-4-nitro-6-(2′-octyl)phenol,
3-sec-butyl-4-hydroxy-5-n-nonylbenzaldehyde,
2,6-diisopropyl-4-nitrophenol,
4-hydroxy-3-isopropyl-5-methylbenzaldehyde,
and 2-n-butyl-6-(3′-heptyl)-4-nitrophenol.

The 2,6-dialkyl-4-nitrophenols of Formula I are yellow, water insoluble crystalline solids and can be prepared by nitrating a 2,6-dialkylphenol with nitric acid, at a temperature ranging from 0 to about 40° C. in the presence of a liquid aliphatic hydrocarbon reaction solvent. The following examples illustrate this preparation.

EXAMPLE 1

Preparation of 4-nitro-2,6-di-tert-butylphenol. In a reaction vessel equipped with stirring, condensing, temperature regulating and reagent introducing means was placed a solution of 103 parts of 2,6-di-tert-butylphenol in 350 parts of isooctane. Over a period of 11 minutes 63 parts of 50 percent nitric acid was added at 20° C. The temperature was kept below 30° C. and after two minutes, a solid began to precipitate. The stirring was continued until a temperature drop was noted and then the solids were filtered off. This material was washed very thoroughly with water and dried to give 62.4 parts (50 percent yield) of crude 4-nitro-2,6-di-tert-butylphenol, M.P. 145–153° C. This material crystallized from isooctane as white needles, M.P. 155.5–156° C.

*Analysis.*—Calculated for $C_{14}H_{21}NO_3$: 66.91 percent carbon; 8.42 percent hydrogen and 5.57 percent nitrogen. Found: 67.20 percent carbon, 8.36 percent hydrogen, and 5.53 percent nitrogen. The molecular weight was found to be 257 with the theoretical being 251.3.

EXAMPLE 2

Preparation of 4 - nitro-2-methyl-6-tert-butylphenol. Into a reaction vessel is charged 60 parts of 70 percent nitric acid and 45 parts of water. To this is added with cooling and agitation 110 parts of 2-methyl-6-tert-butylphenol dissolved in 50 parts of n-hexane. The temperature is maintained at 25–30° C. A precipitate is formed which is filtered and washed with water, a dilute aqueous sodium bicarbonate solution, cold hexane and dried to give 4-nitro-2-methyl-6-tert-butylphenol.

EXAMPLE 3

Preparation of 4-nitro-2-(2-dodecyl)-6-tert-amylphenol. Using the procedure as described in Example 1 a total of 76 parts of 2-(2-dodecyl)-6-tert-amylphenol in 150 parts of benzene is treated wtih 32 parts of 50 percent nitric acid. The temperature is kept below 30° C. The solids formed are filtered off, washed thoroughly and dried to give 4-nitro-2-(2-dodecyl)-6-tert-amylphenol.

EXAMPLE 4

Preparation of 4-nitro-2,6-diisopropyl phenol. In the reaction vessel described in Example 1 was placed a solution of 76 parts of 2,6-diisopropyl phenol in 150 parts by volume of isooctane. To this solution was added 32 parts of 50 percent nitric acid while keeping the temperature below 30° C. The reaction mixture was filtered and the solids thereby recovered were washed thoroughly with water and dried to give 26 parts (47 percent yield of 4-nitro-2,6-diisopropyl phenol, M.P. 115–117° C). These solids were crystallized from isooctane to give white needles, M.P. 117–118° C.

*Analysis.*—Calculated for $C_{12}H_{17}NO_3$; 64.55 percent carbon, 7.38 percent hydrogen. Found: 64.60 percent carbon, 7.68 percent hydrogen.

The 3,5-dialkyl-4-hydroxybenzaldehydes of Formula I are white, water insoluble crystalline solids and can be prepared by the bromination of the corresponding 2,6-dialkyl-p-cresol in the presence of alcohol wtih a subsequent hydrolysis of the brominated cresol. The following examples illustrate this preparation.

EXAMPLE 5

Preparation of 3,5-di-tert-butyl-4-hydroxybenzaldehyde. In the reaction vessel equipped with stirring, temperature regulating, and reagent introducing means was placed a solution of 22.3 parts of 2,6-di-tert-butyl-p-cresol and 300 parts of tert-butyl alcohol. Sixty-four parts of bromine was added and the mixture stirred at 25° C. The temperature rose to 67°. Stirring was maintained for an hour after which time the mixture was cooled to 20° C. The crystalline product, a 3,5-di-tert-butyl-4-hydroxy-benzaldehyde was filtered off. The product had a melting point of 189° C.

EXAMPLE 6

Preparation of 3-methyl-5-tert-butyl-4-hydroxybenzaldehyde. In the reaction vessel of Example 1 is placed a solution of 38 parts of methyl-6-tert-butyl-p-cresol in 4 parts of tert-butyl alcohol. The mixture is stirred while 95 parts of bromine are added dropwise at room temperature. During the addition there is a rise in reaction temperature to approximately 65° C. On cooling, crystals appear in the reaction mixture. The mixture is cooled to 15° C. and filtered. The filter cake is washed with an aqueous solution of sodium thiosulfate, with water and is dried under reduced pressure to give 3-methyl-5-tert-butyl-4-hydroxybenzaldehyde.

EXAMPLE 7

Preparation of 3-(3-dodecyl)-5-n-dodecyl-4-hydroxybenzaldehyde. Following the procedure of Example 5, 35.0 parts of 2-(3-dodecyl)-6-n-dodecyl-p-cresol in 500 parts of tert-butyl alcohol is placed in a reaction vessel. The solution is stirred while 80 parts of bromine are added dropwise at room temperature. The mixture is stirred for one hour, under its own heat of reaction. During this time a precipitation appears. The mixture is filtered, washed wtih 10 percent thiosulfate solution, with distilled water and dried under reduced pressure. The product formed is 3-(3-dodecyl)-5-n-dodecyl-4-hydroxybenzaldehyde.

Examples of compounds of Formula II include:
2-(1-n-butyl-n-octyl)-4-(1-cyanomethylene-ethyl)phenol,
n-propyl-β-n-dodecyl-3-methyl-5-(1-methyl-n-hexyl)-α-nitrocinnamate,
n-dodecyl-5-[3-n-dodecyl-2-(1-ethyl-n-pentyl)-6-isopropyl-4-methoxy-5-methylphenyl]-2-trifluoromethyl-2,4-undecadienoate,
methyl-α-acetyl-5-benzyl-2-n-dodecyloxy-3-n-hexycinnamate,
3,5-bis(α-methylbenzyl)-4-(α-methylbenzyloxy)-β-phenyl-α-(trifluoromethyl)cinnamic acid, N,N-di-n-decyl-2-difluoromethyl-11-[3-(p-n-pentylbenzyl)-2-n-hexyloxyphenyl]-12-phenyl-2,4,6,8,10-dodecapentaenamide,
ethyl 3-methyl-5-isopropyl-α-cyano-4-hydroxycinnamate,
[5-(5-tert-butyl-4,6-dihydroxy-m-tolyl)-2,4-pentadienylidene] malonic acid,
ethyl 3,5-di-tert-butyl-α-cyano-4-methoxy-2-(p-n-pentylbenzyloxy)cinnamate,
ethyl α-cyano-2-hydroxycinnamate,
ethyl α-cyanocinnamate,
4-benzyloxy-β-(p-hexylphenyl)-3,5-diisopropyl-α-nitrocinnamide,
N,N-dibenzyl-10-(3-ethyl-5-n-propylphenol)-9-(3-isopropyl-5-methylphenyl)-2-cyano,
2,4,6,8-decatetraenamide,
and benzylidenemalonnitrile.

The additive compounds of Formula II are generally white to pale yellow, water insoluble crystalline solids and can be prepared by reacting a compound having the formula:

with a compound having the formula: X—CH—Y, under basic conditions. The base to be used and the conditions of the reaction vary, depending on the type of constituents desired to be reacted. Thus, ethyl 3,5-di-tert-butyl-α-hydroxycinnamate can be prepared by the reaction of 3,5-di-tert-butyl-4-hydroxybenzaldehyde with ethyl cyanoacetate in dioxane, made basic with piperidine. Likewise, o-(2-nitrovinyl)phenol may be prepared by the reaction of salicyladehyde with nitromethane in ethanol, made basic with potassium hydroxide. In this reaction the temperature of the mixture is maintained below 0° C. during the reaction. The product is separated following a neutralization of the reaction mixture with dilute hydrochloride acid. Similarly N,N-di-n-dodecyl-2-difluoromethyl-11 - [3-(p-n-pentylbenzyl)-2-n-hexyloxyphenyl]-12-phenyl-2,4,6,8,10-dodecapentaenamide can be prepared from the reaction of 3-(p-n-pentylbenzyl)-2-n-hexyloxyphenyl-α-phenylbenzaldehyde with N,N-di-n-dodecyl-2-di-fluoromethyl-2,4,6,8-undecapentaenamide in ethanol, made basic with piperidine. Also, 3-n-butyl-α-n-dodecylcarbonyl-6-ethyl-2-isopropyl-4-hydroxy-5-methylcinnamide can be prepared from the reaction of 3-n-butyl-6-ethyl-2-isopropyl-4-hydroxy-5-methylbenzaldehyde with 2-dodecylcarbonylethanamide in ethanol, made basic with piperidine.

In this invention the term plastic is used to represent any one of a group of materials which consist of, or contains as an essential ingredient, a thermosetting or thermoplastic substance of high molecular weight, and which, while solid in the finished state, is soft enough at some stage in its manufacture to be formed into various shapes, usually through the application, singularly or together, of heat and pressure. Examples of such plastics are the phenolic resins; the aminos, such as urea-formaldehyde resins and melamine-formaldehyde resins; the unsaturated and saturated polyester resins, including the oil modified alkyd resins; the styrene homopolymers and copolymers, such as polystyrene and styrene-acrylonitrile copolymer; the acrylic monomers and polymers; substituted acrylic and methacrylic acids, their salts, esters, and other derivatives, such as nitriles and amides; the cellulosics, such as cellulose acetate, cellulose acetate butyrate, cellulose nitrate, cellulose propionate, ethyl cellulose, nitrocellulose, carboxymethyl cellulose, hydroxyethyl cellulose, and cellophane; linear and branched polyolefins, such as polyethylene and polypropylene; the polyureathanes; the vinyl homopolymers, and copolymers, such as polyvinyl chloride, polyvinyl acetate, polyvinyl chloride acetate, polyvinyl acetals, polyvinyl alcohols, polyvinyl butyral, and polyvinyl formal, polyvinylidene chloride, polyvinylidene copolymers, polyvinyl alkylethers, polyvinyl pyrrolidene, polyvinyl carbazole, polyvinyl naphthanate, polyvinyl benzoate, and polyvinyl fluoride; the polyamides; the condensation products of dibasic organic acids and diamines such as nylon; sulfur-vulcanized and non-vulcanized natural rubber, rubbery homopolymers of conjugated dienes, and rubbery copolymers of a conjugated diene and a monoolefinic compound having the $CH_2=C=$ group.

The above material also includes those plastics which are in combination with other material, for exmaple with fillers such as flour, cotton, shredded or chopped cloth, chopped canvas, paper pulp forms, asbestos, powdered mica, calcium carbonate, carbon, graphite, quartz, diatomaceous silica, fibrous glass, barytes, calcium silicate, iron, barium sulfate, litharge, and clay; plasticizers such as phthalates, phosphates, esters including adipates, azelates and sebacates, polymeric plasticizers including polyesters of adipic, azelaic, and sebacic acid with glycols terminated with long-chain fatty acids, epoxy, fatty acid esters, esters of glycols such as phthalyl glycolates, sulfonamides; secondary plasticizers including hydrocarbons, chlorinated hydrocarbons, nitrated hydrocarbons; polymerizable plasticizers; stabilizers such as inorganic acid derivatives including basic lead carbonate, tribasiclead sulfate, dibasiclead phosphite, sodium carbonate, di-, and trisodium phosphate and the salts of polyphosphoric acid partial esters, organic acid salts including the metal salts of stearic, lauric, ricinoleic, capric, caproic, myristic, 2-ethylhexanoic, maleic, phthalic, naphthenic, alkylated benzoic and salicylic acids, organometallics including dibutyltin dilaurate, dibutyltin maleate and their mixtures, dibutyltin monomethoxy, monomethylmaleate and the dialkyltin mercaptans, organic compounds including the epoxides, organic phosphites, polyols, nitrogen derivatives; antioxidants, colorants such as the dyes, the organic pigments and inorganic pigments; and reinforcing fibers.

The compounds of Formula I and Formula II used pursuant to this invention are both employed in concentrations up to about 5 percent, and preferably from 0.001 to about 3 percent by weight, based upon the weight of the plastic material. The preferred concentration ranges provides very effective stabilization against the oxidative and deteriorative effects of ultraviolet light. The exact amount of additive compounds used in relation to the plastic and also relative to each other is flexible and determined by the needs of the particular plastic to be protected. Thus, the additive mixture can consist of from 5 to 95 percent by weight of a compound of Formula I and from 95 to 5 percent by weight of a compound of Formula II. Embodiments of this invention containing such a concentration ranges will be found in the examples to follow. In general, however, we prefer to use the additives with such concentrations that a compound of Formula I is present in the plastic in approximately the same concentration as a compound of Formula II.

The additive compounds of this invention can be incorporated into the plastic material by a variety of means. For example, a convenient method of addition to plasticized materials is to dissolve the absorbers in the plasticizer. The absorbers can also be added by dry blending with the resin powder or granules prior to processing. For example, with polyesters, the absorbers can be added to the resin from a master batch solution of the absorbers in the monomer, or they can be incorporated by stirring into the cut polyester resin system; in polystyrene a convenient procedure is to add these materials to the polystyrene beads. The mixture is then dry-tumbled and extruded. With cellulosics applicants have found that incorporating the absorbers in the plasticizer is most convenient. In vinyl plastics the absorbers may be added to a dry powder form of the rigid vinyl copolymer. The mixture is then milled and calendered or extruded. In polyethylene the absorbers can be added to the raw polymer at the same time as other ingredients. The resultant mixture is then subjected to extrusion or calendering. The absorbers can also be added to dry polyethylene and mixed by milling. In plastics containing fillers of the various sorts, the absorbers can be premixed with the filler before their incorporation.

A preferred embodiment of this invention consists of a plastic as defined above containing up to about 5 percent, and preferably from 0.001 to about 3 percent of a compound of Formula II as defined above; and up to about 5 percent, and preferably from 0.001 to about 3 percent, of a compound of Formula I wherein, in the compound of Formula I, $R_1$ and $R_2$ are tert-butyl groups. These compositions are preferred because of the high antioxidant effectiveness, excellent ultraviolet light absorbence capacity, and high stability of the preferred compounds of Formula I. Examples of the preferred compounds of Formula I of this embodiment include: 2,6-di-tert-butyl-4-nitrophenol and 3,5-di-tert-butyl - 4-hydroxybenzaldehyde.

Another preferred embodiment of this invention consists of a plastic as defined above containing up to about 5 percent, and preferably from 0.001 to about 3 percent, of a compound of Formula I wherein $R_1$ and $R_2$ are tert-butyl groups; and a compound of Formula II wherein $n$ is zero. These compositions are preferred because of the greater stability of the additive compound of Formula II. Examples of the preferred compounds of Formula II in this embodiment include:

4-(3-di-fluoro-2-difluoromethyl-1-methyl-1-propenyl)-6-isopropyl-m-cresol,
2-tert-butyl-3,6-dihydroxy-5-isopropyl-4-methoxy-N,N-dimethyl-α-nitrocinnamide,
n-octyl-3-n-dodecyl-β-(p-ethylbenzyl)-4-(p-ethylbenzyloxy)-5-n-octyl-α-cyanocinnamate,
1-ethoxy-3-(1-nitromethylene-n-propyl)benzene,
N,N-dibenzyl-α-cyano-β-n-dodecyl-2,3,4,5,6-pentahydroxycinnamide,
diethyl (2-ethoxy-3,4,5,6-tetrahydroxy-α-phenylbenzylidene)malonate, and
β-(o-ethylphenyl)-3-hydroxy-5-isopropoxy-2,6-dimethyl-N,N-bis(p-n-pentylbenzyl)-4-(2-propenyl)-α-nitrocinnamide.

Still another preferred embodiment of this invention consists of a plastic as defined above containing up to about 5 percent, and preferably from 0.001 to about 3 percent, of a compound of Formula I wherein $R_1$ and $R_2$ are tert-butyl groups; and up to about 5 percent, and preferably from 0.001 to about 3 percent, of a compound of Formula II wherein $n$ is 0 and Z is hydrogen. These compositions are preferred because of the greater ultraviolet light absorbence capacity and greater stability of the preferred additive compound of Formula II in this embodiment. Examples of the compounds of Formula II of this embodiment include:

3-n-butyl-α-n-dodecylcarbonyl-6-ethyl-2-isopropyl-4-hydroxy-5-methylcinnamide,
p-(2-nitrovinyl)phenol,
n-decyl-α-difluoromethyl-2,4,-di-n-dodecyl-3,6-dihydroxycinnamate,
o-(2-nitrovinyl)phenol,
ethyl α-cyanocinnamate,
1,3,4-tri-n-butyl-5-(2,2-dinitrovinyl)-2,6-dimethoxybenzene,
ethyl α-cyano-4-hydroxycinnamate,
2,6-di-tert-butyl-3-(2,2-dicyanovinyl)hydroquinone,
ethyl α-cyano-2-hydroxycinnamate, and
3-(o-hydroxybenzylidene)-2,4-pentanedione.

A particularly preferred embodiment of this invention consists of a plastic as defined above containing up to about 5 percent, and preferably from 0.001 to about 3 percent, of a compound of Formula I wherein $R_1$ and $R_2$ are tert-butyl groups; and up to about 5 percent, and preferably from 0.001 to about 3 percent, of a compound represented by the formula (III) 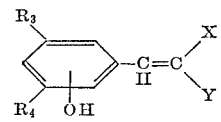

wherein $R_3$ is an alkyl radical containing from 1–12 carbon atoms; $R_4$ is an alpha-branched alkyl radical containing from 3–12 carbon atoms; Y is selected from the group consisting of hydrogen, a cyano radical, a nitro radical and a group having the formula

—CON(R)$_2$
—COOR
—COR wherein R is selected from the group consisting of hydrogen, alkyl radicals containing from 1–12 carbon atoms and aralkyl radicals containing from 7–12 carbon atoms; X is selected from the group consisting of a cyano radical, a nitro radical and a group having the formula

—CON(R)$_2$
—COOR
—COR

These compositions are particularly preferred because of the high antioxidant effectiveness as well as excellent ultraviolet light absorbence capacity of the compounds of Formula III in this embodiment. Examples of the compounds of Formula III of this embodiment include:

[3-n-dodecyl-2-hydroxy-5-(1-n-propyl-n-nonyl)benzylidene]malonamide,
2,6-di-tert-butyl-4-(2-nitrovinyl)phenol,
2,6-diisopropyl-4-(2-cyanovinyl)phenol,
2,4-di-tert-butyl-6-(2-nitrovinyl)phenol,
6-tert-butyl-4-(2-nitrovinyl)-o-cresol,
[3-(1-ethyl-n-hexyl)-2-hydroxy-6-n-pentylbenzylidene] malonic acid,
2-tert-butyl-6-(2-nitrovinyl)-p-cresol,
6-isopropyl-4-(2,2-dicyanovinyl)-o-cresol,
(3,5-di-tert-butyl-4-hydroxybenzylidene)malononitrile,
(3-tert-butyl-4-hydroxy-5-methylbenzylidene)malononitrile, and
ethyl α-acetal-3,5-di-tert-butyl-4-hydroxycinnamate.

A most particularly preferred embodiment of this invention consists of a plastic as defined above containing up to about 5 percent, and preferably from 0.001 to about 3 percent, of a compound of Formula I wherein $R_1$ and $R_2$ are tert-butyl groups; and up to about 5 percent, and preferably from 0.001 to about 3 percent, of a compound of Formula III wherein X is a cyano group and Y is represented by the formula: —COOC$_2$H$_5$. These compositions are most particularly preferred because of the high antioxidant effectiveness, excellent ultraviolet light absorbence capacity and high stability of the additive compounds. Examples of the compounds of Formula III of this embodiment include:

ethyl-(α-cyano-4-hydroxy-3-tert-butyl-5-methyl)cinnamate,
ethyl-(α-cyano-4-hydroxy-3,5-diisopropyl)cinnamate,
ethyl-(α-cyano-2-hydroxy-3-isopropyl-5-methyl)cinnamate,
ethyl-(3,5-di-tert-butyl-α-cyano-2-hydroxy)cinnamate,
ethyl-(3,5-di-tert-butyl-α-cyano-4-hydroxy)cinnamate, and
ethyl-(3-tert-butyl-α-cyano-2-hydroxy-5-methyl)cinnamate.

Some of the benefits derived from the practice of this invention are demonstrated by comparative accelerated weathering tests of uninhibited polyethylene and polyethylene containing the additive compounds of this invention. These tests are a modification of ASTM D795–57T and are conducted as follows: The selected amount of additive compound is blended with the polyethylene by milling a weighed quantity of plastic pellets on a warm rollmill. The weighed quantity of additive compounds are added to the mill after the polyethylene has been pre-milled for a short period of time. The plastic containing the additive compounds are then compression molded between polished plates to form sheets. The specimens which are cut from the sheet are 4 inches in length and 1½ inches in width with a tapered end as shown in FIGURE 4, ASTM D795–57T. The specimens are fastened on a light-colored corrosion-resistant metal disc approximately 17 inches in diameter and 0.1 inch in thickness. The disc is mounted on a phonograph turntable operating at approximately 33 r.p.m. and is centered under an S–1 bulb (which consists of a combination tungsten filament-mercury arc enclosed in Corex D glass which absorbs most of the radiation below 2800 A. The resultant radiation comprises that range of the ultraviolet spectrum which has the most deteriorative effect upon the stability of plastic, namely the 2800–4000° A. range. The specimens are arranged so that the bottom planes are 6 inches from the bottom of the bulb. The ambient temperature is maintained at 55 to 60° C. with a fan. The specimens are exposed throughout the test to ultraviolet radiation with the same side up during the duration of the test. At the end of the test, observations are made regarding surface changes (such as color, dulling and chalking) and deep-seated changes (such as checking, crazing, warping and discoloration). In tests of this nature polyethylene specimens containing a mixture of 0.5 weight percent of 3,5-di-tert-butyl-4-hydroxybenzaldehyde and 0.05 weight percent of ethyl-3,5-di-tert-butyl-α-cyano-4-hydroxycinnamate show substantial stability toward the effects of ultraviolet light, whereas uninhibited polyethylene shows a high degree of discoloration, crazing, warping, and chalking.

In other tests of this nature the compositions of this invention show outstanding superiority to other plastic material not containing an additive compound of this invention. For example, when polypropylene containing a mixture of 0.25 weight percent of 2-methyl-6-tert-butyl-4-nitrophenol and 0.25 weight percent of ethyl-(α-cyano-4-hydroxy-3-tert-butyl-5-methyl)cinnamate is subjected to the above test, the protected test specimen shows substantially no physical change while an unprotected polypropylene specimen is greatly deteriorated and shows the effects of oxidation due to the absorption of ultraviolet light. Likewise, when a phenolic resin containing a mixture of 0.50 weight percent of 2,6-di-tert-butyl-4-nitrophenol and 0.25 weight percent of ethyl-3,5-di-tert-butyl-α-cyano-4-hydroxycinnamate is subjected to ultraviolet radiation, as in the above test, it remains substantially unchanged after the test period whereas unprotected phenolic resins show the deteriorative and oxidative effects of ultraviolet radiation.

The following examples further illustrate compositions which when subjected to the above test show no substantial change in physical characteristics as compared to the corresponding unprotected plastic.

EXAMPLE 8

Five weight percent of 3-(o-hydroxybenzylidene)-2,4-pentanedione and 2.0 weight percent of 6-tert-butyl-2-methyl-4-nitrophenol are mixed with the dibutyl ester of phthalic acid. While cellulous acetate is stirred in a heated vessel the dibutyl thalate ester is sprayed onto the powdered resin. The mixture is blended and poured into a mold cavity where it is extruded into a sheet. Specimens are cut and tested as described above.

EXAMPLE 9

Two-hundredths weight percent of 2,6-di-(3'-dodecyl)-4-nitrophenol and 0.20 weight percent of 3-n-butyl-α-n-dodecyl-carbonyl-6-ethyl-2-isopropyl-4-hydroxy-5-methylcinnamide are added to dry powdery polyvinyl acetate. The mixture is then milled and extruded into sheets. Specimens are cut and tested as described above.

EXAMPLE 10

Polyester resin is cut finely and stirred in a heated vessel. 0.08 weight percent of n-octyl-3-n-dodecyl-β-(p-ethylbenzyl)-4-(p-ethylbenzyloxy) - 5 - n - octyl - α-cyanocinnamate and 0.08 weight percent of 3-(3'-dodecyl)-5-methyl - 4 - hydroxybenzaldehyde are added and the mixture is heated, poured into a mold and extruded into a sheet. Specimens are cut and tested as described above.

EXAMPLE 11

One weight percent of ethyl(3,5-di-tert-butyl-α-acetyl-4-hydroxy)cinnamate and 1.5 weight percent of 2-sec-butyl-4-nitro-6-n-octylphenol are added to polystyrene beads. The mixture is then dry-tumbled, poured into a mold and extruded into sheets. Specimens are cut and tested as described above.

EXAMPLE 12

Sodium methacrylate is mixed with 0.001 weight percent of 3,5-diisopropyl-4-hydroxybenzaldehyde and 0.019 weight percent of 6-tert-butyl-4-(2-nitrovinyl)-o-cresol, poured into a mold and extruded with heat and pressure into a sheet. Samples are cut and tested as described above.

EXAMPLE 13

Nitrocellulose is mixed with 0.35 weight percent of 2-isopropyl-6-methyl-4-nitrophenol and 0.15 weight percent of 2,6-di-tert-butyl-4-(2-nitrovinyl)phenol, poured into a mold and extruded under heat and pressure into a sheet. Specimens are cut and tested as described above.

EXAMPLE 14

Three weight percent of o-(2-nitrovinyl)phenol and 0.8 weight percent of 3-n-amyl-5-(2'-hexyl)-4-hydroxybenzaldehyde are mixed with dry powdered half-second butyrate, poured into mold and extruded with heat and pressure into a sheet. Specimens are cut and tested as described above.

In all of the above tests, the plastics containing additive compounds of this invention show very little or no substantial change in physical structure and properties, while the corresponding unprotected plastics are very severely adversely affected by the ultraviolet radiation, showing crazing, cracking, and discoloration.

The following examples, in which all the parts are by weight, further illustrate the embodiments of this invention.

EXAMPLE 15

To a master batch of highly density polyethylene having a specific gravity of 0.965, a compression ratio of 2.0, a tensile strength of 5500 p.s.i., a compressive strength of 2400 p.s.i., a Shore D hardness of 70 and a heat distortion temperature, under 66 p.s.i., of 180° F. is added 5.0 weight percent of n-dodecyl-5-[3-n-dodecyl-2-(1 - ethyl - n - pentyl) - 6 - isopropyl - 4 - methoxy - 5-methylphenyl]-2-trifluoromethyl-2,4-undecadienoate and 0.75 weight percent of 3-tert-butyl-5-methyl-4-hydroxybenzaldehyde to prepare a composition of outstanding stability toward the oxidative effects of ultra-violet light.

EXAMPLE 16

A linear polyethylene having a high degree of crystallinity, up to 95 percent, and less than one ethyl branched chain per 100 carbon atoms, a density of about 0.96 grams per millimeter and which has about 1.5 double bonds per 100 carbon atoms, is treated with $50 \times 10^{-6}$ roentgens of β radiation. To the thus irradiated polymer is added 0.001 weight percent of 3,5-di-(2'-decyl)-4-hydroxybenzaldehyde and 0.005 weight percent of ethyl (α-cyano-4-hydroxy-3,5-diisopropyl)cinnamate and the resulting product has better stability characteristics toward the destructive effects of ultraviolet light.

EXAMPLE 17

Two parts of 2-(2'-octyl)-6-ethyl-4-nitrophenol and 1.3 parts of 2,6-diisopropyl - 4-(2-trifluoromethyl - 3,3,3-trifluoro-1-propenyl)phenol are added with milling to 100 parts of low density polyethylene which has a specific gravity of 0.910, a compression ratio of 1.8, a tensile strength of 1000 p.s.i., a Shore D hardness of 41 and a heat distortion temperature, under 66 p.s.i., of 105° C. The resulting product is vastly improved in its stability toward the deteriorative effects of ultraviolet light.

EXAMPLE 18

To 10,000 parts of a medium density polyethylene having a specific gravity of 0.933, a compression ratio of 2.0, a tensile strength of 1800 p.s.i., a Shore D hardness of 60 and a heat distortion temperature, under 66 p.s.i., of 135° F., is added 10.0 parts of p-(2-nitrovinyl)phenol and 5.0 parts of 3-sec-butyl-5-n-nonyl - 4-hydroxybenzaldehyde to prepare a composition of outstanding stability toward the oxidative and deteriorative effects of ultraviolet light.

EXAMPLE 19

To a batch of polypropylene having a specific gravity of 0.90, a tensile strength of 4300 p.s.i., a compressive strength of 8500 p.s.i., a Rockwell hardness of 85 and a heat distortion temperature of 210° F., under 66 p.s.i., is added 3.0 weight percent of N,N-dibenzyl-α-cyano-β-n - dodecyl - 2,3,4,5,6-pentahydroxycinnamide and 2.0 weight percent of 2,6-diisopropyl-4-nitrophenol to prepare a composition of exceptional stability toward the deteriorative effects of ultraviolet light.

EXAMPLE 20

To a polyproylene having a specific gravity of 0.91, a heat distortion temperature of 230° F., under 66 p.s.i., a Rockwell hardness of 110, a tensile strength of 5700 p.s.i., and a compressive strength of 10,000 p.s.i., is added 0.5 weight percent of ethyl 3-methyl - 5 - isopropyl - α - cyano-4-hydroxycinnamate and 0.5 weight percent of 3-isopropyl-5-methyl-4-hydroxybenzaldehyde and the resulting product has excellent stability toward the deteriorative effects of ultraviolet light.

EXAMPLE 21

To 5,000 parts of an acetal plastic having a specific gravity of 1.4, a tensile strength of 10,000 p.s.i., a compressive strength of 18,000 p.s.i., a Rockwell hardness of 118 and a heat distortion temperature, under 66 p.s.i., of 338° F., is added 20.0 parts of 2-n-butyl -6-(3'-heptyl)-4-nitrophenol and 10.0 parts of ethyl (α-cyano-2-hydroxy-3-isopropyl-5-methyl)cinnamate to yield a composition of outstanding stability toward the effects of ultraviolet light.

EXAMPLE 22

To a batch of chlorinated polyether having a density of 1.4, a flexural strength of 5,000 p.s.i., a Rockwell hardness of 100, a tensile strength of 6,000 p.s.i., and a heat distortion temperature, under 66 p.s.i., of 300° F. is added 3.0 weight percent of benzylidenemalononitrile and 3.0 weight percent of 6-sec-butyl-2-ethyl-4-nitrophenol to prepare a composition of extreme stability toward the effects of ultraviolet light.

EXAMPLE 23

1.5 parts of methyl α-acetal-5-benzyl-2-n-dodecyloxy-3-n-hexylcinnamate and 0.15 part of 2,6-di-(3'-heptyl)-4-nitrophenol are added to 100 parts of a nylon molding compound containing 30 percent of a glass fiber filler, which composition has a density of 1.30, a heat distortion temperature of 490° F. under 264 p.s.i., a compressive strength of 15,000 p.s.i., and a tensile strength of 14,000 p.s.i. The resulting product is highly stable to the oxidative effects of ultraviolet light.

EXAMPLE 24

To 20,000 parts of a polytetrafluoroethylene molding compound having a density of 2.22, a tensile strength of 4,500 p.s.i. a compressive strength of 1,700 p.s.i., a Shore D hardness of 65 and a heat distortion temperature, under 66 p.s.i., of 250° F. is added 10 parts of 3-(3'-nonyl)-5-n-propyl-4-hydroxybenzaldehyde and 1.0 parts of (3,5-di-tert-butyl-4-hydroxybenzylidene)malononitrile to prepare a composition of excellent stability toward ultraviolet light.

EXAMPLE 25

To each of the compounds in Table I is added 3.0 weight percent of 3,5-di-tert-butyl-4-hydroxybenzaldehyde and 2.0 weight percent of n-propyl-β-n-dodecyl-3-methyl-5-(1-methyl-n-hexyl)-α-nitrocinnamate.

*Table I*

| | Specific Gravity | Compression Ratio | Tensile Strength, p.s.i. | Compressive Strength, p.s.i. | Shore D Hardness | Heat Distortion Temperature, °F. |
|---|---|---|---|---|---|---|
| Vinyl Acetate Molding Compound | 1.18 | | 5,000 | | | 100 |
| Vinyl Alcohol Molding Compound | 1.21 | | 1,000 | | 10 | |
| Vinyl Butyral Molding Compound | 1.07 | | 4,000 | | | 115 |
| Vinyl Chloride Acetate Molding Compound | 1.35 | 2.0 | 5,000 | 8,000 | 70 | 130 |
| Vinylidene Chloride Molding Compound | 1.65 | 2.0 | 3,000 | 2,000 | | 130 |
| Vinyl Chloride Molding Compound | 1.45 | 2.4 | 9,000 | 13,000 | 90 | 165 |
| Vinyl Formal Molding Compound | 1.2 | | 10,000 | | | 150 |

The resulting products are vastly improved in their stability toward the deteriorative effects of ultraviolet light.

EXAMPLE 26

To 5,000 parts of polychlorotrifluoroethylene having a density of 2.1, a compression of 2.0, a tensile strength of 5700 p.s.i., a compressive strength of 32,000 p.s.i., and a Rockwell hardness of 110 is added 2.0 parts of (3-tert-butyl-4 - hydroxy-5-methylbenzylidene)malononitrile and 10.0 parts of 2-tert-butyl-4-nitro-6-n-amylphenol to yield a composition of excellent stability toward ultraviolet light.

EXAMPLE 27

To a batch of methyl methacrylate molding compound having a density of 1.20, a compression ratio of 2.0, a tensile strength of 11,000 p.s.i., a compressive strength of 18,000 p.s.i., and a heat distortion temperature of 195° F. is added 1.0 weight percent of 2,4-di-tert-butyl-6-(2-nitrovinyl)phenol and 1.0 weight percent of 3,5-di-sec-butyl-4-hydroxybenzaldehyde to give a composition of extremely high stability toward the degradative effects of ultraviolet light.

EXAMPLE 28

0.5 parts of 3,5-di-(2'-hexyl)-4-hydroxybenzaldehyde and 0.05 parts of n-decyl α-difluoromethyl-2,4-di-n-dodecyl-3,6-di-hydroxycinnamate are added with milling to 100 parts of polyesterene which has a density of 1.04, a tensile strength of 5,000 p.s.i., a compressive strength of 11,500, and a heat distortion temperature of 150° F. The resulting product is greatly improved in its stability toward the effects of ultraviolet light.

EXAMPLE 29

To 10,000 parts of unfilled melamine-formaldehyde molding compound having a specific gravity of 1.48, a compression ratio of 2.0, a tensile strength of 40,000 p.s.i., and a heat distortion temperature of 298° F. is added 4.0 parts of ethyl (3,5-di-tert-butyl-α-cyano-2-hydroxy)cinnamate and 4.0 parts of 2-(2'-heptyl)-6-n-butyl-4-nitrophenol to give a composition of excellent stability toward the effects of ultraviolet light.

EXAMPLE 30

To each of the compounds in Table II is added 1.3 weight percent of 2,6-di-tert-butyl-4-nitrophenol and 2.0 weight percent of ethyl 3,5-di-tert-butyl-α-cyano-4-methoxy-2-(p-n-pentylbenzyloxy)cinnamate.

*Table II*

| | Specific Gravity | Compression Ratio | Tensile Strength p.s.i. | Compressive Strength, p.s.i. | Rockwell Hardness | Heat Distortion Temperature, ° F. |
|---|---|---|---|---|---|---|
| Ethyl Cellulose Molding Compound | 1.17 | 2.4 | 8,000 | 35,000 | 115 | 190 |
| Cellulose Acetate Molding Compound | 1.32 | | 8,000 | 25,000 | 120 | 160 |
| Cellulose Propionate Molding Compound | 1.24 | 2.4 | 7,300 | 22,000 | 120 | 250 |
| Cellulose Acetate Butyrate Molding Compound | 1.22 | | 6,900 | | 115 | 200 |
| Cellulose Nitrate Molding Compound | 1.40 | | 8,000 | 22,000 | 115 | 160 |

The resulting products are vastly improved in their stability toward the deteriorative effects of ultraviolet light.

EXAMPLE 31

To a batch of mica-filled phenol-formaldehyde molding compound having a specific gravity of 1.65, a compression ratio of 2.1, a tensile strength of 5,000 p.s.i., a compressive strength of 15,000 p.s.i., and a heat distortion temperature of 230° F. is added 5.0 weight percent of 3-sec-butyl-5-n-propyl-4-hydroxybenzaldehyde and 0.75 weight percent of N,N-di-n-dodecyl-2-fluoromethyl-11-[3-(p-n-pentylbenzyl)-2-n-hexyloxyphenyl] - 12 - phenyl-2,4,6,8,10-dodecapentaenamide to prepare a composition of outstanding stability toward the degradative effects of ultraviolet light.

EXAMPLE 32

To 100 parts of filled and vulcanized polyacrylic ester molding compound having a specific gravity of 1.5, a Shore D hardness of 90, and a tensile strength of 2,000 p.s.i. is added 0.02 parts of [3-(1-ethyl-n-hexyl)-2-hydroxy-6-n-pentylbenzylidene]malonic acid and 0.02 part of 2,6-di-sec-butyl-4-nitrophenol to give a composition which is highly stable toward the oxidative effects of ultraviolet light.

EXAMPLE 33

To an asbestos filled polyester molding compound which has a specific gravity of 1.65, a compression ratio of 2.5, a tensile strength of 7,000, a compressive strength of 22,500 p.s.i., and a heat distortion temperature of 315° F. is added 3.0 weight percent of 3-isopropyl-5-ethyl-4-hydroxybenzaldehyde and 0.8 weight percent of ethyl α-cyanocinnamate to give a composition which has outstanding stability toward the effects of ultraviolet light.

EXAMPLE 34

To 1,000 parts of alpha-cellulose filled urea-formaldehyde molding compound which has a specific gravity of 1.47, a compression ratio of 2.2, a tensile strength of 6,000 p.s.i., a compressive strength of 25,000 p.s.i., and a heat distortion temperature of 260° F. is added 15 parts of ethyl (3-tert-butyl-α-cyano-2-hydroxy-5-methyl) cinnamate and 15 parts of 2-n-amyl-6-(3'-heptyl)-4-nitrophenol. The resulting composition is highly stable toward the degradative and oxidative effects of ultraviolet light.

EXAMPLE 35

To a batch of epoxy molding compound having a specific gravity of 1.88, a tensile strength of 10,000 p.s.i., a compressive strength of 13,000, and a heat distortion temperature of 290° F. is added 0.019 percent of 3-n-butyl-5-sec-butyl-4-hydroxybenzaldehyde and 0.001 percent of 6-isopropyl-4-(2,2-dicyanovinyl)-o-cresol to give a composition which has excellent stability toward the effects of ultraviolet light.

EXAMPLE 36

0.3 part of 1,3,4-tri-n-butyl-5-(2,2-dinitrovinyl)-2,6-dimethoxybenzene and 0.3 part of 2,6-di-(2'-octyl)-4-nitrophenol are added to 100 parts of phenolic cast resin containing an asbestos filler and having a specific gravity of 1.70, a tensile strength of 6,000 p.s.i., a compressive strength of 12,500 p.s.i., and a Rockwell hardness of 110. The resulting product is vastly improved in its stability toward the oxidative and degradative effects of ultraviolet light.

EXAMPLE 37

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.0 parts of 2,6-di-tert-amyl-4-nitrophenol and 1.5 parts of ethyl α-cyano-4-hydroxycinnamate. This batch is then cured for 60 minutes at 45 p.s.i. of steam pressure. The resulting composition is extremely stable toward the oxidative and deteriorative effects of ultraviolet light.

EXAMPLE 38

Natural rubber stock is compounded according to the following formula:

| | Parts by weight |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 2,6 - di - tert - butyl - 3 - (2,2-dicyanovinyl)hydroquinone | 1 |
| 3,5-di-tert-amyl-4-hydroxybenzaldehyde | 1 |
| Benzothiazyl disulfide | 0.4 |
| Amine activator | 0.5 |

This stock is then vulcanized for 60 minutes at 280° F. The resulting composition is extremely stable toward the oxidative and deteriorative effects of ultraviolet light.

EXAMPLE 39

A butadiene-acrylonitrile copolymer is produced from butadiene-1,3 and 32 percent of acrylonitrile. Two weight percent, based on the dry weight of the copolymer of 6-di-tert-butyl-4-nitrophenol and 0.2 weight percent of ethyl α-cyano-2-hydroxycinnamate are added as an emulsion in sodium oleate solution to the latex obtained from emulsion copolymerization of the monomers. The latex is coagulated with a pure grade of aluminum sulfate and the coagulum, after washing, is dried for 20 hours at 70° C. The resulting composition is extremely stable toward the oxidative and deteriorative effects of ultraviolet light.

EXAMPLE 40

A polyester resin is cut finely and stirred in a heated vessel. Five weight percent of 3,5-di-tert-butyl-4-hydroxybenzaldehyde and 2.0 weight percent of ethyl 3,5-di-tert-butyl-α-cyano-4-hydroxycinnamate are added to the mixture which is stirred and incorporated as an extender in fiber glass. This fiber glass is then formed into an external decorative paneling. The resultant paneling keeps its finish and luster, being extremely stable toward the oxidative and deteriorative effects of ultraviolet light.

While our invention is directed to plastics stabilized against the oxidative and deteriorative effects of ultraviolet light, the additive compounds of this invention are also useful as ultraviolet light absorbers in other materials, such as textiles, fuels, antiknock fluid mixes, paints, pigments, sun-tan lotions, foods, dyes, photographic material, woods, paper, fibrous materials, lubricants, functional fluids and other materials subject to change, oxidation or deterioration by ultraviolet light. Such materials can be protected by either admixing the additive compound directly with them or by placing a transparent carrier containing the additive compounds of this invention between the material to be protected and the source of light.

In the foregoing description our invention was described as plastic containing a stabilizing quantity of a compound of Formula I and a compound of Formula II. It will now be obvious that our invention also includes plastic stabilized by inclusion therein of one or more compounds of Formula I and one or more compounds of Formula II. Thus, another embodiment of our invention comprises plastic containing a small stabilizing quantity, up to about 5 percent, and preferably from 0.001 to about 3 percent each of one or more compounds of Formula I; and a small stabilizing quantity, up to about 5 percent, and preferably from 0.001 to about 3 percent each of one or more compounds of Formula II.

Thus, another preferred embodiment of this invention comprises plastic containing a small stabilizing quantity, up to about 5 percent and preferably from 0.001 to about 3 percent, of a compound represented by Formula I wherein Q is $NO_2$; a small stabilizing quantity, up to about 5 percent and preferably from 0.001 to about 3 percent, of a compound of Formula I wherein Q is HC=O; and a small stabilizing quantity, up to about 5 percent and preferably from 0.001 to about 3 percent of a compound of Formula II.

The compounds of Formula I and Formula II used pursuant to these embodiments are employed in concentrations up to about 5 percent, and preferably from 0.001 to about 3 percent by weight based upon the weight of the plastic material. The preferred concentration ranges provide plastic which is very effectively stabilized against the degradative effects of ultraviolet light. The exact amount of the compounds used in relation to the plastic and also relative to each other is flexible and determined by the number of compounds present in the mixture and the needs of the particular plastic to be protected. Thus, in the mixture comprising two compounds of Formula I and one compound of Formula II, there can be from 5 to 90 percent by weight of each compound in the mixture.

Some of the benefits derived from this embodiment are demonstrated by subjecting plastic containing the additive mixtures described in the preferred embodiment to the comparative accelerated weathering test described above. In such tests polyethylene specimens containing a mixture of 0.05 weight percent of 3,5-di-tert-butyl-4-hydroxybenzaldehyde, 0.05 weight percent of 2,6-di-tert-butyl-4-nitrophenol and 0.05 weight percent of ethyl-3,5-di-tert-butyl-α-cyano-4-hydroxycinnamate shows substantial stability toward the effects of ultraviolet light, whereas inhibited polyethylene shows a high degree of discoloration, crazing, warping and chalking. Likewise, when a polypropylene containing a mixture of 0.20 weight percent of 2-methyl-6-tert-butyl-4-nitrophenol, 0.10 weight percent of 3,5-diisopropyl-4-hydroxybenzaldehyde, and 0.10 weight percent of ethyl-3-methyl-5-tert-butyl-α-cyano-4-hydroxycinnamate is subjected to ultraviolet radiation as in the above tests, it shows no substantial physical change, whereas an unprotected polypropylene specimen is greatly deteriorated and shows the effects of oxidation due to ultraviolet light absorption.

We claim:

1. A stabilizing mixture comprising from 5 to 95 weight percent of a compound having the formula:

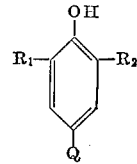

wherein $R_1$ is an alkyl group having from one to 12 carbon atoms, $R_2$ is an alpha-branched alkyl group having from 3 to 12 carbon atoms, and Q is selected from the group consisting of HC=O and $NO_2$; and from 95 to 5 weight percent of a compound having the formula:

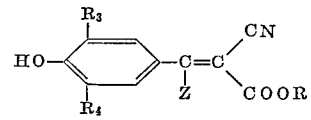

wherein $R_3$ is an alkyl radical containing from one to 12 carbon atoms, $R_4$ is an alpha-branched alkyl radical containing from 3 to 12 carbon atoms and R is selected from the group consisting of hydrogen, alkyl radicals containing from one to 12 carbon atoms and aralkyl radicals containing from 7 to 12 carbon atoms; and Z is selected from the group consisting of hydrogen, alkyl radicals containing from one to 12 carbon atoms, aryl radicals containing from 6 to 12 carbon atoms and aralkyl radicals containing from 7 to 12 carbon atoms.

2. A high molecular weight organic plastic selected from the class consisting of thermosetting and thermoplastic polymers containing a stabilizing amount of up to about 5 percent by weight of a compound having the formula:

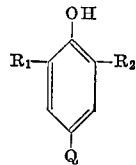

wherein $R_1$ is an alkyl group having from 1 to 12 carbon atoms, $R_2$ is an alpha-branched alkyl group having from 3 to 12 carbon atoms, and Q is selected from the group consisting of HC=O and $NO_2$; and a stabilizing amount of up to about 5 percent by weight of a compound having the formula:

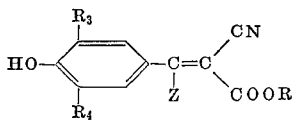

wherein $R_3$ is an alkyl radical containing from one to 12 carbon atoms, $R_4$ is an alpha-branched alkyl radical containing from 3 to 12 carbon atoms and R is selected from the group consisting of hydrogen, alkyl radicals containing from one to 12 carbon atoms and aralkyl radicals containing from 7 to 12 carbon atoms; and Z is selected from the class consisting of hydrogen, alkyl radicals have one to 12 carbon atoms, aryl radicals having 6 to 12 carbon atoms, and aralkyl radicals having 7 to 12 carbon atoms.

3. A high molecular weight organic plastic selected from the group consisting of thermosetting and thermoplastic polymers containing a stabilizing quantity up to about 5 weight percent of 3,5-di-tert-butyl-4-hydroxybenzaldehyde and a stabilizing quantity up to about 5 weight percent of ethyl-3,5-di-tert-butyl-α-cyano-4-hydroxycinnamate.

4. Polyethylene containing a stabilizing amount, up to about 5 weight percent, of 3,5-di-tert-butyl-4-hydroxybenzaldehyde and a stabilizing amount, up to about 5 weight percent, of ethyl-3,5-di-tert-butyl-α-cyano-4-hydroxycinnamate.

5. Polypropylene containing a stabilizing amount, up to about 5 percent, of 3,5-di-tert-butyl-4-hydroxybenzaldehyde and a stabilizing amount, up to about 5 weight percent, of ethyl-3,5-di-tert-butyl-α-cyano-4-hydroxycinnamate.

References Cited by the Examiner
UNITED STATES PATENTS

| | | | |
|---|---|---|---|
| 2,364,027 | 11/1944 | Marshall | 260—45.95 |
| 2,610,120 | 9/1952 | Minsk et al. | 96—115 |
| 2,775,574 | 12/1956 | Slocumbe et al. | 260—45.85 |
| 2,845,399 | 7/1958 | Newberg et al. | 260—45.95 |
| 3,052,636 | 9/1962 | Strobel et al. | 260—45.9 |
| 3,069,456 | 12/1962 | Strobel | 260—45.9 |
| 3,074,971 | 1/1963 | Strobel et al. | 260—347.4 |
| 3,085,003 | 4/1963 | Morris | 260—45.95 |
| 3,085,097 | 4/1963 | Strobel et al. | 260—45.85 |

FOREIGN PATENTS

| | | |
|---|---|---|
| 1,087,902 | 8/1960 | Germany. |
| 838,547 | 8/1960 | Great Britain. |
| 566,024 | 8/1957 | Italy. |

OTHER REFERENCES

Lundberg: "Autooxidation and Antioxidants," vol. II, Interscience Publishers, 1962, pages 931–939 relied upon (footnoted references of these pages are cited on pages 981–984).

Campbell et al., JACS, vol. 74, p. 1471.

LEON J. BERCOVITZ, *Primary Examiner.*

MILTON STERMAN, DONALD E. CZAJA,
*Examiners.*